United States Patent [19]

Schuette et al.

[11] Patent Number: 5,302,366

[45] Date of Patent: Apr. 12, 1994

[54] PRODUCTION OF SILICON PRODUCT CONTAINING BOTH CARBON AND NITROGEN

[75] Inventors: George F. Schuette; Michael C. Carter; Bruce W. Gerhold, all of Bartlesville, Okla.

[73] Assignee: Phillips Petroleum Company, Bartlesville, Okla.

[21] Appl. No.: 676,403

[22] Filed: Mar. 28, 1991

[51] Int. Cl.[5] ...................... C01B 31/36; C04B 35/58
[52] U.S. Cl. .................................... 423/346; 423/344; 423/406; 423/439; 501/92
[58] Field of Search ............... 423/344, 345, 346, 351, 423/439, 406; 501/88, 92

[56] References Cited

U.S. PATENT DOCUMENTS

| | | | |
|---|---|---|---|
| 4,022,872 | 5/1977 | Carson et al. | 423/297 |
| 4,333,916 | 6/1982 | Iwai et al. | 423/371 |
| 4,891,339 | 1/1990 | Calcote et al. | 501/87 |
| 5,108,729 | 4/1992 | Gerhold et al. | 423/346 |
| 5,176,893 | 1/1993 | Gerhold et al. | 423/344 |

OTHER PUBLICATIONS

Cannon, W. R., et al., "Sinterable Ceramic Powders From Laser-Driven Reactions: I, Process Description and Modeling", *Journal of the American Ceramic Society*, vol. 65, No. 7 (Jul. 1982), pp. 324–330.
Cannon, W. R., et al., "Sinterable Ceramic Powders From Laser-Driven Reactions: II, Powder Characteristics and Process Variables", *Journal of the American Ceramic Society*, vol. 65, No. 7 (Jul. 1982), pp. 330–335.
Danforth, S. C., et al., "Mechanical Properties of Sintered and Nitrided Laser-Synthesized Silicon Powder", *Journal of the American Ceramic Society*, vol. 66, No. 4 (Apr. 1983), pp. C-58 to C-59.
Johnson, Jr., D. W., "Nonconventional Powder Preparation Techniques", *American Ceramic Society Bulletin*, vol. 60, No. 2 (Feb. 1981), pp. 221–224 and 243.

*Primary Examiner*—Olik Chaudhuri
*Assistant Examiner*—Ken Horton
*Attorney, Agent, or Firm*—William R. Sharp

[57] ABSTRACT

A ceramic product comprising both carbon and nitrogen and a method for its production are provided. The product is formed in a reactor having a chamber defined therein which is divided into a combustion zone and a reaction zone. A combustible mixture is injected into the combustion zone in a direction generally toward the reaction zone, and is accordingly combusted in the combustion zone to produce hot combustion products. At least one reactant containing carbon, nitrogen and an additional component (i.e. silicon) is injected at the boundary between the zones into the reactor chamber so as to flow with the hot combustion products into the reaction zone and react to form the ceramic product.

11 Claims, 3 Drawing Sheets

PRODUCTION OF SILICON PRODUCT CONTAINING BOTH CARBON AND NITROGEN

BACKGROUND OF THE INVENTION

This invention relates to a ceramic product containing both carbon and nitrogen, and a method for producing such a ceramic product.

Ceramic powders, such as carbon-containing carbides and nitrogen-containing nitrides, exhibit properties which make them particularly useful in the fabrication of highly stressed, wear resistant parts. For example, silicon carbide is noted for its excellent oxidation resistance, whereas silicon nitride is noted for its high strength. Because of such different, yet desirable properties, some efforts have been made to produce "composite" materials for the purpose of combining such desirable properties in a single ceramic powder. Although ceramic powders containing both carbon and nitrogen, such as admixtures of a carbide and nitride, have been produced with some succes, further development in the form of novel product powders and methods for producing such product powders would be desirable.

SUMMARY OF THE INVENTION

It is, therefore, an object of the invention to provide a novel ceramic product powder containing both carbon and nitrogen, and also a method for producing such a product powder.

The above object is realized by a method which comprises: providing a reactor having a chamber defined therein which has a longitudinal axis and longitudinally separated upstream and downstream ends, wherein the chamber comprises a combustion zone and a reaction zone such that the combustion zone longitudinally extends from the upstream end to a boundary between the zones and such that the reaction zone longitudinally extends from the boundary to the downstream end; establishing a flow of a combustible mixture in the combustion zone so as to flow in a direction generally toward the reaction zone, wherein the combustible mixture comprises a mixture of a fuel and an oxidant; combusting the combustible mixture in the combustion zone to produce hot combustion products which flow generally toward and into the reaction zone; injecting at least one reactant into the chamber from the boundary so as to flow with the hot combustion products into the reaction zone, wherein said at least one reactant contains carbon, nitrogen and an additional component capable of bonding to carbon and nitrogen, and wherein the temperature conditions in at least a portion of the reaction zone are at least about 1400° C. and the elemental molar ratio of carbon to oxygen for the combination of the combustible mixture and said at least one reactant is at least about 0.8:1; whereby a product powder containing carbon, nitrogen and the additional component is produced in the reaction zone.

According to another aspect of the invention, there is provided a product powder produced in accordance with the above-described method and which can be further characterized by the following weight percentages: silicon in the amount of about 40 weight percent to about 75 weight percent, carbon in the amount of about 5 weight percent to about 30 weight percent, nitrogen in the amount of about 5 weight percent to about 30 weight percent, and oxygen in the amount of about 1 weight percent to about 20 weight percent. NMR (nuclear magnetic resonance) analysis of the product powder is further believed to indicate simultaneous bonding of at least some of the silicon to both carbon and nitrogen.

DETAILED DESCRIPTION OF THE INVENTION

Figure 1:
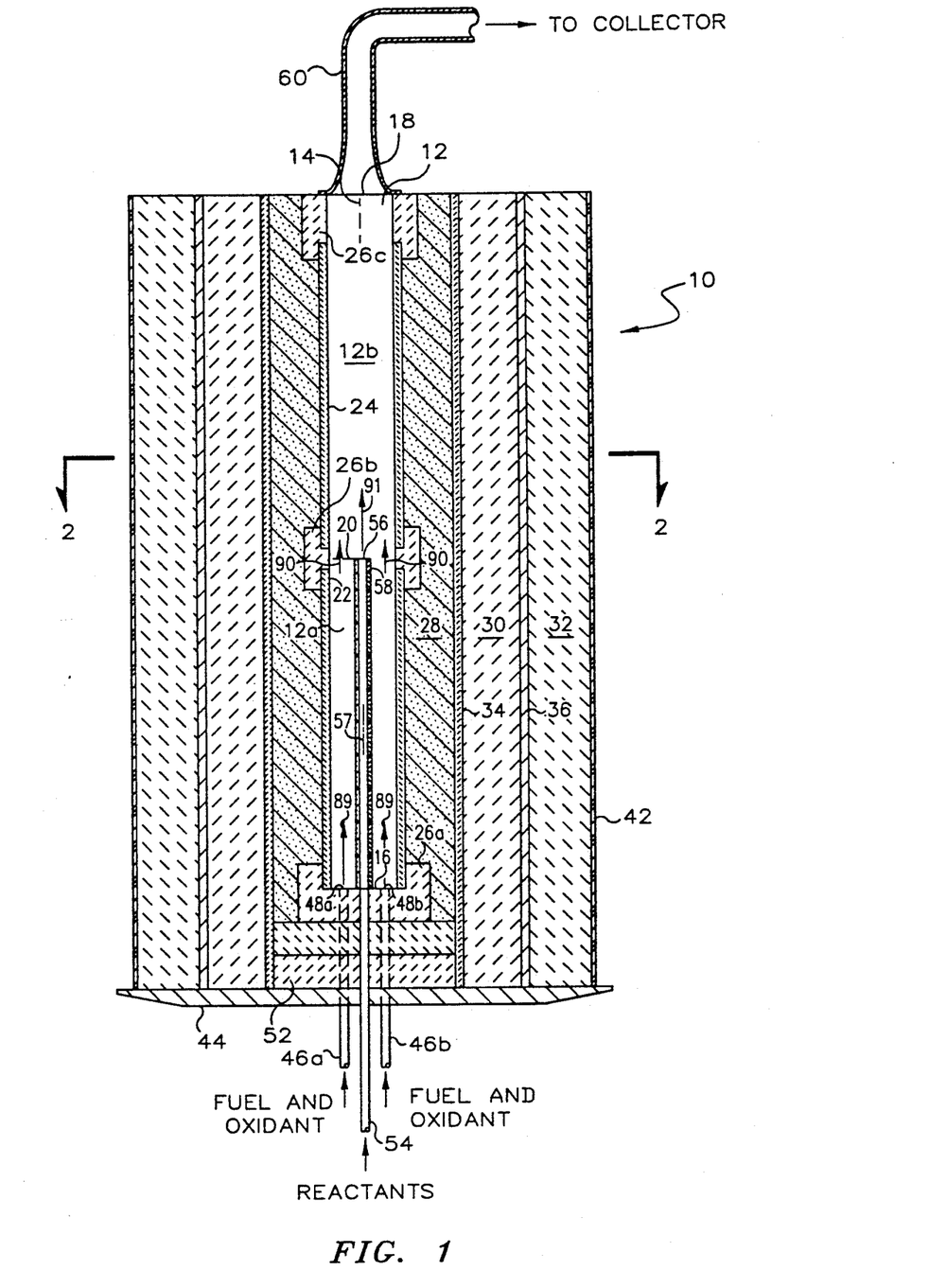
FIG. 1 is a cross-sectional view of a reactor for practicing the method of the invention.

Referring to FIG. 1, there is shown a cross-sectional view of a reactor 10 having defined therein a chamber 12 which has a longitudinal axis 14 and longitudinally separated upstream and downstream ends 16 and 18, respectively. Chamber 12 includes a combustion zone 12a and a reaction zone 12b situated such that combustion zone 12a extends from upstream end 16 to an imaginary surface, in this case planar, boundary 20 between the zones and such that the reaction zone 12b extends from boundary 20 to downstream end 18.

Chamber 12 is defined by refractory tubes 22 and 24 and also inserts 26a, b and c. Such tubes and inserts are preferably composed of a refractory material resistant to temperature of at least 2000° C., such as zirconia, which is commercially available from Zircoa Products of Solon, Ohio.

As shown, there is provided several additional coaxially positioned layers of refractory material which are generally annular in shape and which surround tubes 22 and 24, including: layer 28, preferably comprising zirconia powder insulation, available from Zircar Products of Florida, N.Y., which allows for contraction and expansion of this layer; layer 30, which preferably comprises alumina-silica blanket insulation, commercially available under the trademark Fiberfrax ® from Carborundum of Niagara Falls, N.Y.; and layer 32, which may be of the same composition as layer 30. A refractory cylinder 34, preferably low density thermal insulating alumina available from Zircar Products of Florida, N.Y., is illustrated as separating layers 28 and 30, and a metal cylinder 36 most preferably composed of stainless steel separates layers 30 and 32. Cylinders 34 and 36 assist in providing structural support for the reactor.

The outermost refractory layer 32 is held in place by a cloth material 42, such as fiberglass, which wraps around the exterior surface of layer 32. The bottom end of the various layers are supported by a metal plate 44. The reactor is preferably oriented vertically as shown for the sake of operating convenience. If any of the refractory material breaks or cracks, it tends to stay in position if the various layers and tubes are vertically positioned. Therefore, operation can sometimes continue despite such structural defects.

Each of combustion nozzles 46a and 46b are connected to a source of fuel and oxidant and have respective outlet ends 48a and 48b which communicate with combustion zone 12a of chamber 12 at a position closely adjacent to upstream end 16 of chamber 12. As shown, nozzles 46a and 46b are surrounded by refractory inserts 52 positioned near upstream end 16. Although not shown in FIG. 1, a third combustion nozzle 46c having an associated outlet end 48c is also provided. See FIG. 2 which shows all three combustion nozzles.

A single reactant nozzle 54 is connected to a source of reactants, discussed later in detail, and extends through refractory inserts 52 and from upstream end 16 of chamber 12 to an outlet end 56 which communicates with chamber 12 at boundary 20. As shown, nozzle 54 has a longitudinal axis 57 which in the illustrated embodiment is parallel to longitudinal axis 14 of chamber 12. Most preferably for the purpose of optimally minimizing deposits on chamber-defining walls of, for example, refractory tubes 24 and 26, etc., longitudinal axis 57 corresponds to longitudinal axis 14 of chamber 12 such that said outlet 56 is positioned substantially on longitudinal axis 14. A plurality of generally annular refractory members 58, preferably composed of a suitable temperature resistant material such as zirconia-based ZYFB3 as available from Zircar Products, are preferably stacked upon one another so as to surround nozzle 54 along its length within chamber 12. Other types of thermal insulating layers could also be employed. Such refractory members 58 minimize heat exchange between nozzle 54 and chamber 12 so as to thereby minimize heat loss from the chamber.

Proper positioning of the nozzles with respect to each other is an important consideration in optimizing operating efficiency and quality of the product. It is desirable, for example, to position reactant nozzle outlet 56 and corresponding surface boundary 20 far enough downstream from the combustion nozzle outlets so that substantially all of the free oxygen has reacted with the fuel to form combustion products before reaching the surface boundary 20. Such positioning of the nozzles means that there is substantially no free oxygen ($O_2$ in its free gaseous state, uncombined with any other component) at surface boundary 20, thus avoiding the undesirable oxidation of one of the reactants, as will be discussed further in connection with operation of the apparatus. It is furthermore desirable to position outlet 56 sufficiently downstream to avoid the jet pump effect on gases flowing from outlet 56. This effect tends to pull the reactants upstream rather than the intended downstream flow. However, in addition to the above considerations, outlet 56 should be positioned sufficiently upstream to ensure that temperatures to which the reactants are exposed are conducive to the formation of the ceramic product. In regard to the above-discussed optimum positioning of reaction nozzle outlet 56, the illustrated embodiment enables particularly convenient adjustment of the position of outlet 56 by simply longitudinally withdrawing or further extending nozzle 54 from or into chamber 12.

Also shown in FIG. 1 is conduit 60 which is connected at one end to reactor 10 so as to communicate with the downstream end 18 of chamber 12. Conduit 60 receives the product powder therethrough which then passes to a suitable collector, discussed further below. Conduit 60 in the illustrated embodiment not only functions to transport the product powder to the collector, but also functions as a heat exchanger. The outside of conduit 60 is exposed to a cooling means such as ambient air which allows heat transfer via both natural convection and radiation. Such heat transfer effects cooling of the product powder as it flows through conduit 60, which is highly desirable in order to prevent undesirable reactions involving, for example, formation of unwanted oxides. In addition, such cooling of the product powder is desirable to prevent damage to the collector from excessively hot product. In instances where a cloth filter bag is used as the collector, conduit 60 should be of sufficient length to cool the product powder to a desired temperature, typically below about 100° C., before it enters the collector. Other types of collectors require less cooling. If desired, the cooling effect can be further enhanced by surrounding conduit 60 with a cooling coil or jacket having coolant fluid flowing therethrough.

With respect to materials for conduit 60, it is preferable that a non-metallic material be employed which will not add any undesirable metal contaminants to the product powder. If the desired product contains silicon as a component, for example, quartz (silicon dioxide) is preferred since molecular structures characterized by silicon-oxygen bonds are already present in the reactor product such that essentially no additional contaminants will enter the product stream. Quartz is also a particularly preferred material because of its high emissivity and excellent thermal shock resistance. However, other heat exchange materials, including metals, could also be employed.

The collector can be any suitable means of collecting the product powder. One suitable collector, as discussed above, comprises a cloth filter bag connected to the downstream end of conduit 60. Other suitable collectors include metal filters, electrostatic precipitators and cyclone separators. Of course, regardless of what type of collector is used, a pressure differential should preferably be established by a suitable pump across the collector to draw the product powder through conduit 60 and into the collector.

Figure 2:
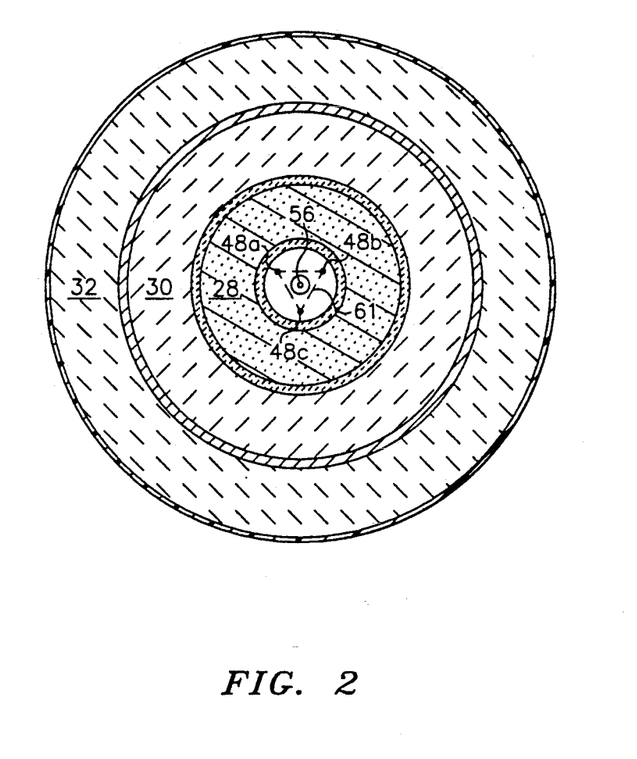
FIG. 2 is a cross-sectional view of the reactor of FIG. 1 as viewed along line 2—2.

Referring now to FIG. 2, this view shows all three combustion nozzle outlets 48a, 48b and 48c and their relative positions with respect to reactant nozzle outlet 56. As can be seen from FIGS. 1 and 2, the combustion nozzle outlets define an imaginary linear boundary 61 whose projection in a direction generally parallel to longitudinal axis 14 of chamber 12 and onto surface boundary 20 generally surrounds outlet 56. In operation, this feature advantageously provides a sheath of combustion products around reactants injected from outlet 56 so as to assist in protecting the chamber walls from deposit-forming reactions involving the reactants. In the particular embodiment illustrated, boundary 61 is generally triangular in shape and is positioned with respect to outlet 56 such that outlet 56 is generally centrally located within the above-mentioned projection of boundary 61. Most preferably, and as shown, the combustion nozzle outlets are equidistantly spaced from one another.

Figure 3:
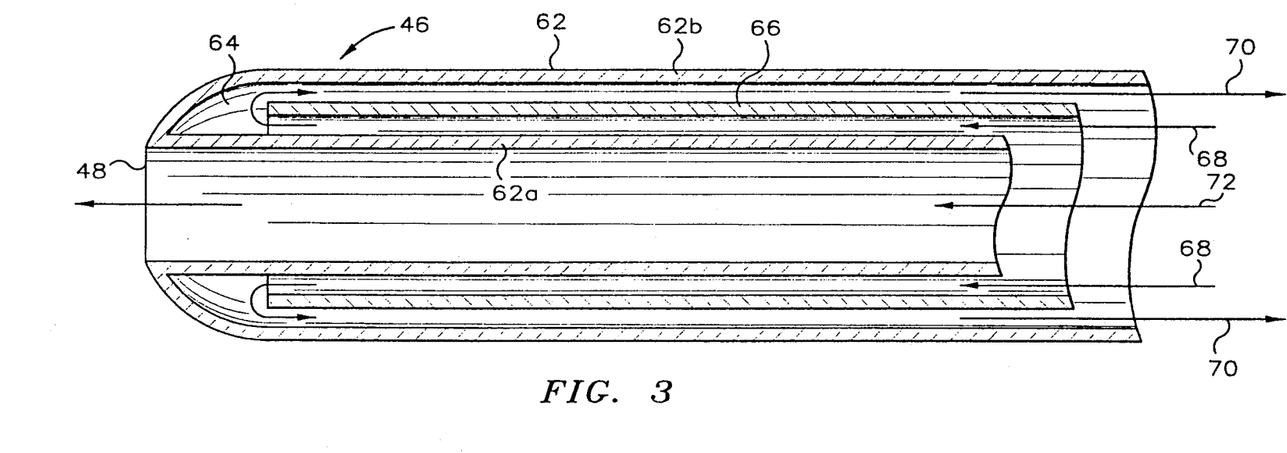
FIGS. 3 and 4 are enlarged cross-sectional views of nozzles which are shown in FIG. 1.

Referring to FIG. 3, there is shown a cross-sectional view of a portion of a nozzle labeled as 46, which represents any one of the combustion nozzles 46a, 46b and 46c which are each identical in structure and operation. Nozzle 46 comprises a tubular member 62, preferably constructed of a metal such as stainless steel, which has an inner sidewall 62a and an outer sidewall 62b. Such sidewalls define a generally annular space 64 therebetween which is connected to a source of coolant fluid such as water or ethylene glycol or a combination thereof, which could also include minor amounts of additives such as corrosion inhibitors, etc. if desired. A tubular member 66 is positioned within annular space 64 so as to generally divide the space into entrance and exit passageways for the coolant fluid. As shown, coolant fluid flows toward the tip of nozzle 46 as indicated at 68, and flows away from the tip in the opposite direction as indicated at 70. The direction of coolant fluid flow may be reversed if desired. The flow of coolant fluid through space 64 assists in preventing melting of the metallic tubular members, and also assists in preventing the flame from burning back (flashback) into nozzle 46 by keeping the interior of nozzle 46 below the autoignition temperature of the fuel/oxidant mixture. The interior of nozzle 46 is connected to a source of fuel and oxidant such that a flow of the fuel/oxidant mixture is established through nozzle 46 as indicated at 72.

Figure 4:
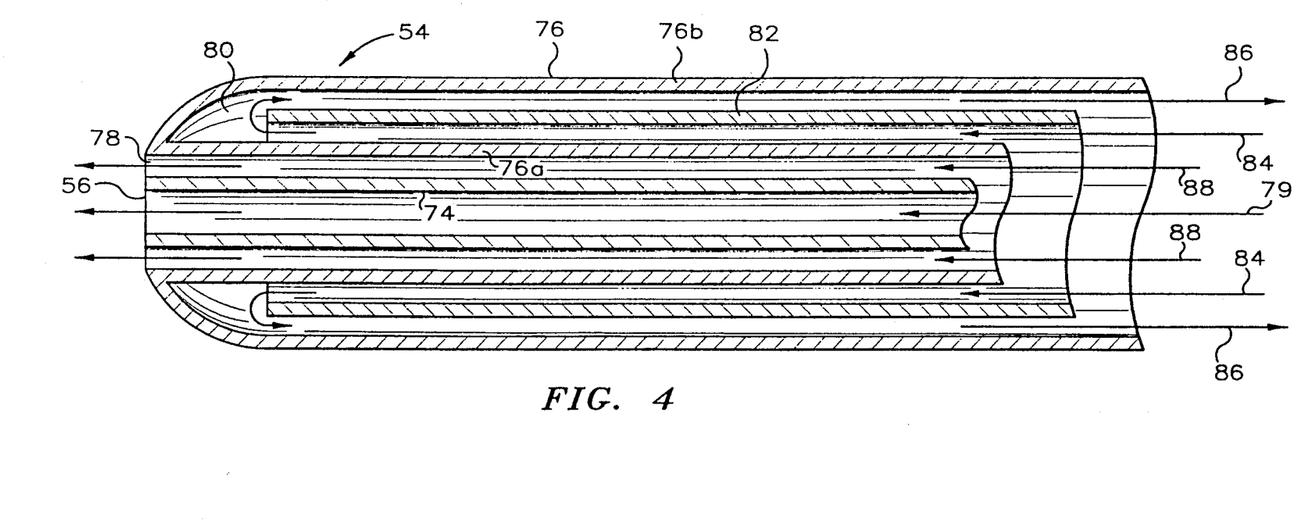

Referring to FIG. 4, there is shown a cross-sectional view of reactant nozzle 54 having outlet end 56. Nozzle 54 is preferably constructed of the same or similar metallic material as that used for nozzle 46, and includes tubular members 74 and 76. As shown, tubular member 74 is positioned generally coaxially within tubular member 76 such that a generally annular space 78 is defined between the interior surface of member 76 and the exterior surface of member 74. The interior of tubular member 74 is connected to a source of reactants to provide a flow of reactants therethrough as indicated at 79. Tubular member 76 is generally of the same design as member 62 in FIG. 2, and includes respective inner and outer sidewalls 76a and 76b between which there is defined a generally annular space 80. A tubular member 82 is positioned within annular space 80 so as to divide it into entrance and exit passageways. Space 80 is connected to a source of coolant fluid so as to establish respective entrance and exit flow paths 84 and 86. The reverse direction of coolant fluid flow can be employed if desired. The flow of coolant fluid not only assists in preventing melting of the metallic tubular members, but also helps prevent the formation of ceramic deposits within nozzle 54 by maintaining the temperature of the nozzle below temperature limits conducive to ceramic product formation. This avoids the need to periodically clean ceramic product deposits from nozzle surfaces.

Annular space 78 is connected to a purge gas source to establish a flow of such purge gas through annular space 78 in the direction of outlet end 56, as indicated at 88. Thus, this flow of purge gas exits outlet end 56 in a generally annular stream so as to surround the reactants as they exit the nozzle. This annular gas stream forms a sheath around the reactants so as to prevent contact of the hot combustion gases in chamber 12 (see FIG. 1) with the reactants immediately after their exit from nozzle 54, thereby preventing the formation of deposits on the tip of nozzle 54. Such deposits, if not prevented, can eventually lead to blockage of reactant flow from nozzle 54 and consequent reactor shutdown. Of course, the insulative sheath of purge gas disperses after only a few milliseconds, but this is sufficient time to allow the reactants to flow far enough away from the nozzle tip to prevent formation of undesirable deposits. The choice of purge gas is not critical, and can be, for example, an inert gas (i.e. helium or argon) or a cooled waste gas as discharged from the reactor.

The various gas flows are preferably established and controlled by conventional equipment not shown in the drawings. Gas can be supplied by, for example, pressurized gas bottles. The gas can pass from such a pressurized container and through an orifice plate whose orifice is sized to achieve sonic velocity of the gas. Such a sonic velocity prevents pressure disturbances from traveling upstream, so that whatever happens downstream near the reactor will not affect the desired flow rate of gas. A pressure regulator can be employed to control the rate of flow of the gas.

Turning now to another aspect of the invention, there is provided a method of making a ceramic product powder using the above-described apparatus.

The product powder of the invention is produced in accordance with a preferred embodiment, described in detail hereafter, by reacting three reactants. A first reactant contains a first elemental component, a second reactant contains carbon as a second component, and a third reactant contains nitrogen as a third component. Each of the reactants contributes such components to the product powder as is produced in the reactor. Although employing the three reactants is preferred, it should be understood that fewer reactants could be employed if such reactants contain all three components and contribute such components to the product powder. Such alternate embodiments are further discussed following description of the preferred embodiment.

According to certain broad aspects of the invention, the first component as contained in the first reactant may be any element capable of bonding with carbon and also nitrogen. For example, the first component may be a metal such as tungsten, chromium, titanium, zirconium or molybdenum. Halides of such metals are particularly suitable as the first reactant. Or, the first component may be a metalloid such as boron or silicon. Reactants having silicon as the first component are of particular interest in connection with the present invention.

Preferred silicon-containing first reactants which are compounds of silicon include silane ($SiH_4$) and substituted silanes. As used herein and in the appended claims, a substituted silane can be generally expressed by the formula SiABCD where each of A, B, C and D can be any element or combination of elements as long as at least one of A, B, C and D is not hydrogen, and where A, B, C and D can be the same or different. For example, any one of A, B, C and D can be selected from hydrogen, a halogen, an oxygen-containing group (i.e. $OSi(CH_3)_3$), a nitrogen-containing group (i.e. $NHSi(CH_3)_3$), an alkyl group, an aryl group, a silyl group, or a group containing multiple silicon atoms. Examples of such substituted silanes include: alkyl silanes such as methylsilane (($CH_3)SiH_3$), dimethylsilane (($CH_3)_2SiH_2$), trimethylsilane (($CH_3)_3SiH$) and tetramethylsilane ($Si(CH_3)_4$); halogenated silanes such as dichlorosilane ($H_2SiCl_2$); halogenated methylsilanes such as trimethyl silicon bromide (($CH_3)_3SiBr$) and dichlorodimethylsilane (($CH_3)_2SiCl_2$); siloxanes such as hexamethyldisiloxane (($CH_3)_3SiOSi(CH_3)_3$); silazanes such as hexamethyldisilazane (($CH_3)_3SiNHSi(CH_3)_3$); and silicon halides such as silicon tetrachloride ($SiCl_4$). Cyclic and polymeric silicon compounds are also within the scope of the invention. If desired, mixtures of any of the preceding silicon-containing compounds can be employed. Silane is the presently preferred silicon-containing reactant in view of the quality of the product.

The carbon-containing second reactant is preferably a $C_1$-$C_9$ carbon compound such as an alcohol or a hydrocarbon. Suitable alcohols include ethanol and propanol. A hydrocarbon is presently most preferred and can be selected, by way of example, from the following group: methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof. Although such $C_1$-$C_9$ carbon compounds are preferred, any carbon-containing reactant capable of reacting with the other reactants to form the ceramic product is within the scope of certain aspects of the invention.

The nitrogen-containing third reactant is preferably a hydronitride such as ammonia ($NH_3$), which is presently preferred, or hydrazine ($N_2H_4$). Although hydronitrides are preferred, any nitrogen-containing reactant capable of reacting with the other reactants to form the ceramic product is within certain aspects of the invention. Additional examples of suitable nitrogen-containing reactants include, for example, amines and nitrogen halides such as $NCl_3$.

The fuel, which is injected through each of nozzles 46a, 46b and 46c, is preferably an unsaturated hydrocarbon (having at least one double or triple bond between carbon atoms), such as, for example, ethylene, propylene, butene, propadiene, butadiene, acetylene, propyne, butyne and mixtures thereof, and can be the same as or different than the hydrocarbon second reactant. A particularly preferred unsaturated hydrocarbon fuel is a mixture of ethylene and acetylene. Employing acetylene in the fuel has been found to increase the temperature in the reaction zone, discussed further below, as compared to ethylene alone, for example, which is desirable to minimize the oxygen content in the product powder. Another preferred group of hydrocarbon fuels are cyclic hydrocarbons such as cyclopropane, cyclobutane, and mixtures thereof. Other types of fuels, such as solid fuels substantially comprising pure carbon, and fuel blends are within the scope of certain aspects of the invention so long as the desired temperature conditions and carbon to oxygen ratio, later discussed, are achieved in the reactor.

The oxidant employed should be capable of accepting electrons from the fuel and is preferably an oxygen-containing gas, most preferably pure oxygen. Gaseous mixtures which include oxygen as a single component, such as air, are within the scope of the invention.

In accordance with a preferred procedure for operating the illustrated apparatus, flow of coolant fluid is started with respect to nozzles 46a–c and 54, followed by gradual heating of the reactor to normal operating temperatures. This is done to avoid thermal shock and possible breakage of various refractory materials. One method for this preheating stage involves initial electrical heating of the refractory layers with electrical rod heaters (not shown) and heating of chamber 12 with a coiled wire electrical heater (not shown) inserted into chamber 12, followed by establishment of a combustion flame in combustion zone 12a.

In any event, the combustion flame is established in combustion zone 12a by initiating a flow of gaseous fuel through nozzles 46a–c. If the reactor has been preheated electrically, the fuel should spontaneously establish a flame by reacting with ambient air at downstream end 18 of chamber 12. If the combustion flame does not form, the fuel may be ignited with an appropriate ignition device. After the flame is established, a flow of air is initiated through nozzles 46a–c so as to produce a fuel/air mixture. This causes the flame to propagate upstream so that the flame establishes itself in combustion zone 12a. Propagation of the flame in this manner can be hazardous to an operator implementing the method such that adequate safety precautions are taken. The reactor is typically operated with this fuel/air mixture for a predetermined period, usually one-half hour to one hour. Operation of the reactor with air as the oxidant is part of the preliminary start-up of the reactor to gradually heat the reactor.

A flow of pure oxygen is now commenced through nozzles 46a–c to replace the air. The flow of such oxygen is gradually increased and the flow of air gradually decreased until a fuel/oxygen combustible mixture is obtained. The combustion flame should be monitored visually through downstream end 18 to make sure that the flame does not flash back upstream so as to enter nozzles 46a–c and cause a potentially dangerous condition. Flashback can be prevented by providing a sufficiently high velocity of fuel and oxygen exiting each of nozzles 46a–c.

A flow of the fuel/oxygen mixture is thus established in a direction generally parallel to axis 14 as indicated at 89, and the fuel and oxygen flow rates are set to be relatively fuel-rich in preparation for production of the product powder. The elemental molar ratio of carbon to oxygen for the fuel/oxygen mixture is preferably at least about 0.7:1, more preferably in the range of about 0.8:1 to about 1.2:1, and most preferably in the range of about 0.9:1 to about 1.1:1. As used herein, the elemental molar ratio of carbon to oxygen means the molar ratio of carbon atoms to oxygen atoms. The residence time of the combustible mixture and hot combustion products formed therefrom in combustion zone 12a is typically about 5 to about 20 milliseconds, which is sufficient time to consume substantially all of the oxygen before reaching boundary 20. As discussed previously, this is desirable to avoid the production of unwanted oxides. Temperature conditions in combustion zone 12a are typically about 1700° C. to about 2000° C. Hot combustion products produced in combustion zone 12a flow toward and into the reaction zone 12b as indicated at 90.

The substantially gaseous reactants are now injected into chamber 12 from reactant nozzle outlet 56, as indicated at 91, such that the reactants exit outlet 56 at boundary 20 in a direction generally parallel to the chamber axis 14, preferably generally along chamber axis 14 and toward downstream end 18. Such injection of reactants generally parallel to chamber axis 14 is particularly desirable in minimizing deposits on the chamber walls. In the illustrated embodiment, the first, second and third reactants are premixed to give a desired elemental molar ratio of first component to the combination of carbon and nitrogen in the reactants, typically about 1:1 to about 1:4 where silicon is the first component, and a desired elemental molar ratio of carbon to nitrogen in the reactants of preferably about 0.01:1 to about 100:1, more preferably about 0.5:1 to about 20:1. As used herein, the elemental molar ratio of carbon to nitrogen means the ratio of carbon atoms to nitrogen atoms. The carbon and nitrogen composition of the product powder can be controlled by adjusting the carbon to nitrogen ratio in the reactants, as will be demonstrated in a subsequent example. Such a mixture is passed through reactant nozzle 54 so as to exit outlet 56 into chamber 12. If the first reactant employed is normally a liquid, such first reactant is placed in vapor form, most conveniently by placing it in a temperature controlled bubbler and passing a purge gas therethrough. The temperature of the coolant fluid flowing through reactant nozzle 54 can be elevated to the necessary extent to help prevent condensation of the first reactant as it passes through reactant nozzle 54.

Flow rates are adjusted so that the elemental molar ratio of carbon to oxygen for the combination of the reactants and fuel/oxygen mixture is at least about 0.8:1, but is preferably in the range of about 0.9:1 to about 1.5:1, and most preferably in the range of about 1:1 to about 1.3:1. Although the reactions occurring in reaction zone 12b are numerous and not completely understood, it is believed that the above cited carbon to oxygen ratios minimize the production of undesirable oxidizing species such as carbon dioxide and water, and produce partial pressures of reducing gases like carbon monoxide and hydrogen which are favorable to the production of the ceramic product. The preferred carbon to oxygen ratios for the fuel/oxygen mixture previously discussed (preferably at least about 0.7:1, more preferably about 0.8:1 to about 1.2:1, and most preferably about 0.9:1 to about 1.1:1) particularly enhance these conditions favorable to the production of ceramic product. In addition, reactor temperature is somewhat dependent on the carbon to oxygen ratio, and temperatures conducive to product formation are achievable using the above-discussed carbon to oxygen ratios.

Temperature conditions for at least a portion of reaction zone 12b are at least about 1400° C., preferably in the range of about 1400° C. to about 1700° C., more preferably in the range of about 1500° C. to about 1600° C. The temperature conditions in the reactor can most conveniently be monitored by means of a thermocouple (not shown) positioned in one of the refractory layers. The temperature detected by the thermocouple can be correlated to actual temperature conditions in the reactor. Of course, a thermocouple can be positioned directly in the chamber 12, but this requires use of expensive materials such as platium and/or rhodium which are still subject to deterioration due to the high temperatures in chamber 12.

Pressure conditions in reaction zone 12b are preferably at or near atmospheric pressure. Other operating pressures are within the scope of the invention.

In reaction zone 12b, a product powder is formed from the reactants which includes the first component as well as the carbon and nitrogen components as is discussed further below. The product powder exits the reactor through downstream end 18 and passes into and through conduit 60 to the collector. After the desired amount of product powder is collected, the reactor is shut down by first switching to air as the oxidant and then gradually decreasing the fuel/oxidant flow rates to provide gradual cooling of the reactor. After shutdown, the reactor is typically allowed to cool for several hours before the supply of coolant fluid to the nozzles is terminated.

In the following description of product produced in accordance with the invention, it is to be understood that the term "weight percent" as applied to a component of a composition is based on the total weight of the composition.

The product powder as collected directly from the reactor where silicon is the first elemental component, contains silicon, carbon and nitrogen as well as oxygen. Such a product powder is characterized by the following weight percentages: silicon in the amount of about 40 to about 75 weight percent, more narrowly in the amount of about 50 to about 70 weight percent, and most narrowly in the amount of about 55 weight percent to about 70 weight percent; carbon in the amount of about 5 to about 30 weight percent, more narrowly in the amount of about 10 to about 30 weight percent, and most narrowly in the amount of about 10 to about 25 weight percent; nitrogen in the amount of about 5 to about 30 weight percent, more narrowly in the amount of about 5 to about 25 weight percent, and most narrowly in the amount of about 5 to about 20 weight percent; and oxygen in the amount of about 1 to about 20 weight percent, more narrowly in the amount of about 1 to about 15 weight percent, and most narrowly in the amount of about 1 to about 10 weight percent. Hydrogen can also be present in the product powder in minor but detectable amounts of between about 0 and about 1 weight percent. Analysis results in a subsequent example are taken to indicate both silicon-carbon bonds and silicon-nigrogen bonds in the product powder. In particular, NMR (nuclear magnetic resonance) analysis is also taken to indicate that at least some of the silicon atoms in the product powder are bonded to both carbon and nitrogen atoms. In other words, at least some of the silicon in the product powder is simultaneously bonded to both carbon and nitrogen.

Individual particles of the product powder in accordance with the invention are highly uniform and have diameters which range from about 0.01 to about 0.3 micron. Submicron and uniform particles are important characteristics in the production of fine-grained, high strength parts.

The product powder can be sintered into heat resistant, high strength parts in a conventional manner. For example, appropriate amounts of additives such as yttrium oxide and aluminum oxide can be added to such product, followed by pressing to a desired shape and heating at a temperature of about 1700° C. to about 2400° C.

It is to be understood that the above description pertains to preferred embodiments of the invention, but that many variations and modifications are within the scope of certain aspects of the invention.

Other variations of the embodiments described above can involve different reactants and/or fuels. For example, it is possible to omit at least one more of the three reactants discussed above, as long as the reactant(s) employed will contribute the first component (i.e. silicon) as well as the carbon and nitrogen components to formation of the product powder. For example, only a silazane could be employed to contribute the various components, or a combination of two reactants, such as a silicon and carbon-containing alkyl silane and a nitrogen-containing reactant such as ammonia, could also be used in production of the product powder. Another possible variation could involve employing a fuel which includes a preferred unsaturated hydrocarbon as well as amounts of other types of hydrocarbons such as saturated hydrocarbons. However, this will generally decrease the heat produced by the combustion reaction so as to possibly require a supplemental heat source (i.e. electric, plasma, microwave, or combustion zones exterior to the reactor chamber but in heat exchange relationship with the reactor chamber, etc.) to obtain the desired temperature conditions in the reaction zone. In any event, it is preferable that the hot combustion products as provided by combustion in the combustion zone provide at least about 15 percent of the energy needed to maintain desired temperature conditions of at least about 1400° C. in the reaction zone.

EXAMPLES

Specific examples will now be described to further illustrate the invention. These examples should not be constructed to limit the invention in any manner.

In each of the following examples, various gaseous flow rates are given in gram moles/minute (abbreviated to gmol/min hereafter). Actual measurements of flow rate were taken volumetrically at room temperature and atmospheric pressure in units of liters/minute. These volumetric measurements were converted to gmol/min by assuming there are 24.45 liters/mole for any gas at 25° C. (room temperature) and at atmospheric pressure.

combustible mixture and reactants (overall C:O ratio), the elemental molar ratio of carbon to nitrogen for the reactants (C:N ratio), as well as the results of product elemental analysis.

TABLE II

| Run No. | $C_3H_6$ gmol/min | $NH_3$ gmol/min | Overall C:O Ratio | C:N Ratio | Product Analysis Wt. % Composition | | | |
|---|---|---|---|---|---|---|---|---|
| | | | | | Si | C | N | O |
| 1 | 0.15 | 0.03 | 1.10 | 15.00 | 64.7 | 22.9 | 6.3 | 6.9 |
| 2 | 0.11 | 0.067 | 1.07 | 4.93 | 66.3 | 17.1 | 11.4 | 7.9 |
| 3 | 0.076 | 0.101 | 1.05 | 2.26 | 67.2 | 16.1 | 13.2 | 7.3 |
| 4 | 0.038 | 0.134 | 1.03 | 0.85 | 65.1 | 12.7 | 18.6 | 6.0 |

All flow rates for gases below are undiluted with any other gases (i.e. carrier gases).

Also in each of the following examples, water was employed as the coolant fluid in the various nozzles.

With respect to elemental analysis results given in various tables, the carbon and nitrogen weight percentages were obtained by means of CHNS combustion analysis, silicon percentages by X-ray fluorescence analysis, and the oxygen percentages by neutron activation analysis. In each example where an elemental analysis was performed, CHNS analysis revealed detectable amounts of hydrogen. However, such detected amounts of hydrogen were less than 1 weight percent and are not reported in the following examples. Weight percentage results which are provided have not been normalized to 100 percent. Variance from 100 percent is attributable to normal analysis inaccuracies.

With respect to terminology and notations used hereafter, it will be understood that all degree readings obtained by X-ray diffraction are for an angle of $2\theta$.

EXAMPLE I (INVENTION)

The purpose of this example is to demonstrate the production of a product powder in accordance with the invention using an apparatus substantially similar to that apparatus illustrated and previously described.

TABLE I

| Item | Dimension |
|---|---|
| Diameter of Chamber 12 | 5.08 cm |
| Overall Length of Chamber 12 | 50.8 cm |
| Length of Combustion Zone 12a | 22.9 cm |
| Length of Reaction Zone 12b | 27.9 cm |
| Overall O.D. of Reactor 10 | 37.5 cm |
| O.D. of Tubular Member 62 | 0.953 cm |
| I.D. of Tubular Member 62 | 0.216 cm |
| O.D. of Tubular Member 74 | 0.318 cm |
| I.D. of Tubular Member 74 | 0.236 cm |
| O.D. of Tubular Member 76 | 0.953 cm |
| I.D. of Tubular Member 76 | 0.396 cm |

Using the above-described apparatus, four runs were made using a mixture of ethylene and acetylene as the fuel and pure oxygen as the oxidant. Flow rates for the ethylene, acetylene and oxygen in each of the runs were 1.56 gmol/min, 0.65 gmol/min and 2.21 gmol/min, respectively, giving an elemental molar ratio of carbon to oxygen for the combustible mixture (combustion C:O ratio) of 1.00. Each of the runs also employed silane as a reactant at a flow rate of 0.12 gmol/min and a flow of helium as a purge gas through the reactant nozzle at a flow rate of 0.31 gmol/min. Table II summarizes other data for the runs, wherein propylene ($C_3H_6$) and ammonia ($NH_3$) were employed as reactants at different flow rates. Such data in Table IB includes flow rates for such propylene and ammonia reactants, the elemental molar ratio of carbon to oxygen for the combination of the combustible mixture and reactants (overall C:O ratio), the elemental molar ratio of carbon to nitrogen for the reactants (C:N ratio), as well as the results of product elemental analysis.

The product analysis results of Table II indicate increasing nitrogen content and decreasing carbon content in response to a decrease in the C:N ratio. The presence of nitrogen in the product is taken to indicate the presence of silicon-nitrogen bonds. Considering other possible bonding of nitrogen to other elements, nitrogen in combination with carbon or oxygen can generally form only gaseous compounds. Therefore, it is reasonable to assume that the nitrogen present in the solid product is bound to at least a portion of the silicon.

X-ray powder diffraction analysis of the products from runs 1–4 resulted in diffraction patterns having peaks at 30°, 60° and 72°. These peaks are taken to indicate silicon-carbon bonds in each of the products.

The products from runs 1 and 3 were further subjected to NMR (nuclear magnetic resonance) analysis. $^{29}Si$ NMR spectra were obtained on a Bruker/IBM WP-200 SY spectrometer (Bruker Instruments, Inc., Billerica, Mass.) operating at 39.75 MHz. A SP/MAS (Single-Pulse Magic Angle Spinning) procedure was employed with 45 degree pulses, 100 second delays, and between 600 to 800 data points for each spectrum. The data was processed and plotted using Bruker DISNMR software.

The NMR spectrum obtained for the product of run 1 revealed peaks at $-15.5$ ppm and $-104.3$ ppm, and the NMR spectrum for the product of run 3 revealed peaks at $-16.9$ and $-112.3$ ppm. The numerical value for each peak was obtained using the above-mentioned software to select the data point having the maximum amplitude for a particular peak. The results of the NMR analysis will be further discussed in a subsequent example.

The product from run 3 was further analyzed with respect to particle size in accordance with the following procedure. A 2 milligram sample of the product powder was placed in a beaker containing 30 cc of a mixture of 0.076 weight percent Triton X100 dispersant (Rohm & Haas Co., Philadelphia, Pa.)) and distilled water. The resulting solution was ultrasonically treated for 2.5 minutes at a power level of 40 watts using a Model W-380 ultrasonic horn (Heat Systems Ultrasonics, Inc., Farmingdale, N.Y.). A particle size distribution was measured using a CAPA-700 Particle Analyzer (Horiba, Tokyo, Japan). The resulting particle size distribution indicates particle diameters ranging from less than about 0.04 micron to about 0.2 micron with 10 percent of the particles examined having diameters less than 0.04 micron. The mean particle diameter was determined to be 0.07 microns.

EXAMPLE II (COMPARATIVE RUNS)

The purpose of this example is to produce a product for comparative purposes which contains a mixture of silicon carbide and silicon nitride.

First, a run was carried out using the reactor of Example I to produce a product comprising silicon carbide. The process conditions of this run differed from the runs of Example I only insofar as the propylene was injected at a flow rate of 0.19 gmol/min and no ammonia was employed as a reactant, thus giving an overall C:O ratio of 1.13. Of course, the C:N ratio for the reactants is not applicable here since there is no nitrogen in the reactants. Elemental analysis of the resulting product revealed 67.5 wt. % silicon, 29.8 wt. % carbon and 5.3 wt. % oxygen. X-ray powder diffraction analysis of the product resulted in a diffraction pattern having peaks at 35°, 60° and 72°, clearly indicative of the presence of beta silicon carbide.

A run was also carried out to produce a product comprising silicon nitride wherein process conditions differed from those of Example I insofar as ammonia was injected as a reactant at a flow rate of 0.17 gmol/min and as a purge gas instead of helium at a flow rate of 0.33 gmol/min, and further insofar as no propylene was employed as a reactant to thereby give an overall C:O ratio of 1.00 and a C:N ratio for the reactants of 0.00. Elemental analysis of the product revealed 59.3 wt. % silicon, 1.8 wt. % carbon, 32.6 wt. % nitrogen and 9.0 wt. % oxygen. The presence of nitrogen in the solid product is taken to indicate bonding of nitrogen to at least a portion of the silicon in the form of silicon nitride.

A 2.01 gram sample of the carbide product was physically mixed with 2.92 grams of the nitride product to produce a mixture having the following elemental composition: 62.6 wt. % silicon, 13.2 wt. % carbon, 19.3 wt. % nitrogen and 7.5 wt. % oxygen. Such weight percentages were calculated from the above cited percentages for the individual products. The mixture was added to isopropanol to form a dilute solution (about 6 wt. % solids) which was treated with an ultrasonic probe at 40 watts for 7.5 minutes. A product powder mixture was recovered after evaporating the isopropanol in air on aluminum foil. NMR analysis of the product mixture by means of the procedure described in Example I revealed peaks at −14.6 ppm, −46.9 ppm and −109.8 ppm.

EXAMPLE III (DATA COMPARISON)

The purpose of this example is to compare and interpret the NMR data obtained in Examples I and II.

Peak location data is summarized in Table III. Products from run 1, run 3 and Example II ("Mixture") are indicated in Table III. The term "Main Peak" indicates the peak of greatest amplitude.

TABLE III

| Product | Main Peak (ppm) | Other Peaks (ppm) |
|---|---|---|
| Mixture (Comparative) | −14.6 | −46.9, −109.8 |
| Run 1 (Invention) | −15.5 | −104.3 |
| Run 3 (Invention) | −16.9 | −112.3 |

With respect to the mixture, the main peak at −14.6 ppm is taken to indicate the presence of silicon carbide, the peak at −46.9 is taken to indicate the presence of silicon nitride, and the peak at −109.8 is taken to indicate oxidation products with silicon-oxygen bonds. The NMR spectra for the products from runs 1 and 3 also exhibit minor peaks between −100 and −115, but more importantly exhibit main peaks at −15.5 ppm and −16.9 ppm, respectively, which is shifted with respect to the silicon carbide peak of −14.6 ppm of the mixture in the direction of the −46.9 ppm silicon nitride peak of the mixture. This is taken to indicate at least some simultaneous bonding of nitrogen as well as carbon to the silicon of the product of the invention. This data also indicates that the product of the invention is not a simple mixture of silicon carbide and silicon nitride.

That which is claimed is:

1. A method comprising the steps of:
   providing a reactor having a chamber defined therein which has a longitudinal axis and longitudinally separated upstream and downstream ends, wherein the chamber comprises a combustion zone and a reaction zone such that the combustion zone longitudinally extends from the upstream end to a boundary between the zones and such that the reaction zone longitudinally extends from the boundary to the downstream end;
   establishing a flow of a combustible mixture in the combustion zone so as to flow in a direction generally toward the reaction zone, wherein the combustible mixture comprises a mixture of a fuel and an oxidant comprising oxygen;
   combusting the combustible mixture in the combustion zone to produce hot cumbustion products which flow generally toward and into the reaction zone;
   injecting a silicon-containing first reactant, a carbon-containing second reactant, and a nitrogen-containing third reactant into the chamber at the boundary so as to flow with the hot combustion products into the reaction zone, wherein the temperature conditions in at least a portion of the reaction zone are at least about 1400° C., the elemental molar ratio of carbon to oxygen for the combination of the combustible mixture, the first reactant, the second reactant, and the third reactant is at least about 0.8:1, and the elemental molar ratio of carbon to nitrogen for the combination of the first reactant, the second reactant, and the third reactant is about 0.5:1 to about 20:1;
   whereby a product powder containing carbon, nitrogen and silicon is produced in the reaction zone.

2. A method as recited in claim 1 wherein the first reactant is silane.

3. A method as recited in claim 1 wherein the second reactant comprises a $C_1$–$C_9$ carbon compound.

4. A method as recited in claim 3 wherein the $C_1$–$C_9$ carbon compound is a hydrocarbon selected from the group consisting of methane, ethane, propane, butane, pentane, hexane, heptane, octane, nonane, ethylene, propylene, acetylene, benzene, toluene, cyclopropane, cyclobutane, cyclopentane, cyclohexane, and mixtures thereof.

5. A method as recited in claim 1 wherein the third reactant is selected from the group consisting of an amine, a hydronitride, and mixtures thereof.

6. A method as recited in claim 5 wherein the third reactant is a hydronitride.

7. A method as recited in claim 6 wherein the hydronitride is ammonia.

8. A method as recited in claim 1 wherein the elemental molar ratio of carbon to oxygen for the combination of the combustible mixture, the first reactant, the second reactant, and the third reactant is about 1:1 to about 1.3:1.

9. A method as recited in claim 8 wherein the elemental molar ratio of carbon to oxygen for the combustible mixture is at least about 0.7.

10. A method as recited in claim 9 wherein the elemental molar ratio of carbon to oxygen for the combustible mixture is about 0.9:1 to about 1.1:1.

11. A method as recited in claim 1 wherein the fuel comprises a hydrocarbon selected from the group consisting of a cyclic hydrocarbon, ethylene, propylene, butene, propadiene, butadiene, acetylene, propyne, butyne, and mixtures thereof.

* * * * *